May 4, 1926.  
E. BLOOM  
1,583,272  
GASOLINE GAUGE  
Filed Dec. 19, 1924

Inventor  
Edward Bloom.

By  
Attorney

Patented May 4, 1926.

1,583,272

UNITED STATES PATENT OFFICE.

EDWARD BLOOM, OF MARION, INDIANA.

GASOLINE GAUGE.

Application filed December 19, 1924. Serial No. 756,946.

*To all whom it may concern:*

Be it known that I, EDWARD BLOOM, a citizen of the United States, residing at Marion, in the county of Grant, State of Indiana, have invented certain new and useful Improvements in Gasoline Gauges; and I do hereby declare the following to be a full, clear, and exact description of the invention, such as will enable others skilled in the art to which it appertains to make and use the same.

This invention relates to new and useful improvements in gasoline tanks, and particularly to gasoline tanks for automobiles.

It is well known that, with the ordinary gasoline tank, no warning is given when the supply of gasoline has fallen to the point where it fails to feed to the engine. In many cases of this character, this happens when the automobile is at a great distance from a filling station, with the result that the driver must walk miles to a station and carry the gasoline.

The present device is especially adapted to permit the gasoline to flow from the tank until a predetermined level has been reached, when the driver can operate certain means to permit the remaining portion of gasoline to flow, which will generally be sufficient to reach a filling station. Thus a reserve supply remains in the tank for the purpose of carrying the automobile to a supply station.

Other objects and advantages will be apparent from the following description when taken in connection with the accompanying drawing.

Figure 1:
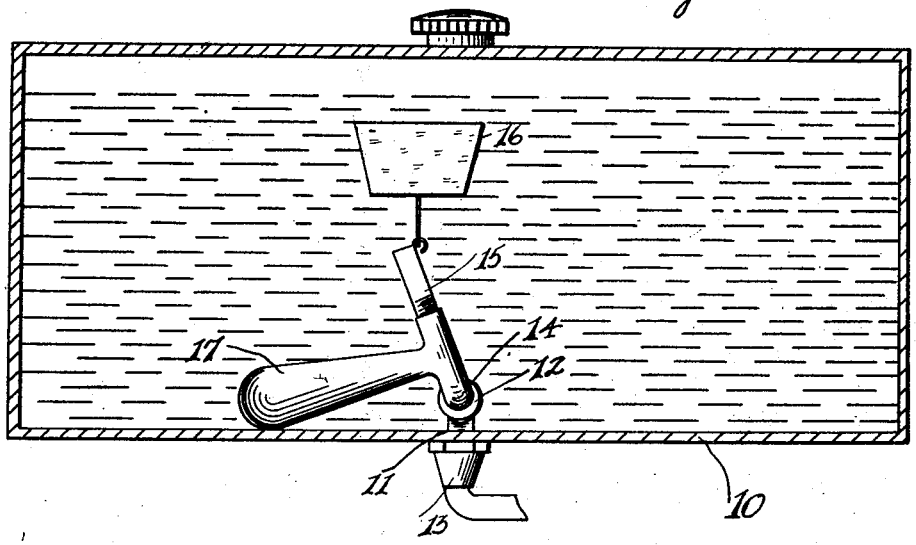
Figure 1 is a vertical sectional view through a gasoline tank, showing the invention in elevated position, which will retain a portion of the gasoline in the tank.
Figure 2:
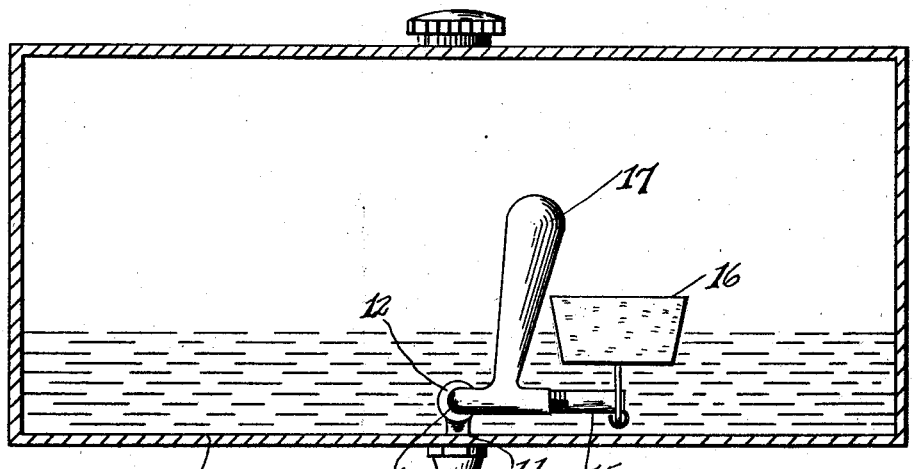
Figure 2 is a similar sectional view, but showing the invention in lowered position to permit the remainder of the gasoline to flow from the tank.
Figure 3:
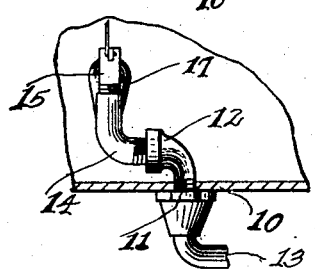
Figure 3 is a fragmentary sectional view on the line 3—3 of Figure 1.

Referring particularly to the accompanying drawing, 10 represents a portion of a gasoline tank, of the character used on automobiles, and in the bottom of which is formed the outlet opening 11. In this opening is secured one end of the pipe elbow 12, the outer end of which is connected with a pipe 13, which leads to a carburetor, not shown, but which will be readily understood. Screwed into the other end of the pipe elbow 12, within the tank, is one end of a second pipe elbow 14, the other end of which has a short length of pipe 15 screwed thereinto. The elbow 14 is arranged to freely rotate within the elbow 12, whereby to stand in a vertical position, at times, and in an approximately horizontal position, at times. Loosely connected to the outer or free end of the pipe 15 is a float body 16, to which reference will be made later herein. Secured to the elbow 14, and extending outwardly therefrom, is a weighted arm 17, said arm being slightly inclined in the direction of the free end of the pipe 15, and arranged to contact with the bottom of the tank to hold the pipe 15 in its vertical position, at times, and to swing over to the other side of the center of swing of said pipe, to hold the pipe in its horizontal position, at times.

When the tank is full of gasoline, the float body 16 will rise within the gasoline, and lift the pipe 15 into its vertical position, whereby when the level of the liquid reaches the upper end of the said pipe, no more gasoline will flow out of the tank, the portion below the level of the said pipe constituting the reserve supply. The driver then reaches into the tank, with any suitable tool, or a hooked piece of wire, and engages the arm 17, so that he may swing the pipe 15 over into its horizontal position, whereupon the reserve supply of gasoline will flow out through the pipe 15. When a new supply of gasoline is introduced into the tank, the float will be carried or lifted so that said float will swing the pipe upwardly, into its vertical position, after which the weighted arm 17 will cause the pipe to be tilted over into a position slightly to one side of a vertical line, said arm then contacting with the bottom of the tank to maintain the pipe in such position, and retain the reserve supply of gasoline.

In similar devices heretofore when the reserve supply had been exhausted, the driver neglected to reset the device when the tank was again refilled, thus rendering the device of no use. With the present device, the driver does not need to interfere with the device when the tank is refilled, as the float 16 automatically resets the reserve supply retainer. The only operation necessary on the part of the driver being to raise the pipe 15 over into its position which will permit the reserve supply to flow from the tank. When the main supply has become exhausted, the driver will not forget, or fail to move the pipe 15 to use the reserve supply, because it will be necessary to the running of the automobile to take advantage of this reserve.

It will, of course, be understood that the float 16 will be completely submerged when the tank is full, or the level of the gasoline is at any considerable distance above the upper end of the pipe 15, such position of the float maintaining the pipe 15 in its vertical position, against the counterbalancing effect of the weighted arm 17.

What is claimed is:

1. The combination with a gasoline tank, of an outlet means mounted in the tank and arranged to stand in an approximately vertical position to permit a certain quantity of gasoline to flow from the tank and maintain a reserve supply therein, means for maintaining the outlet means in such position, said outlet means being adapted to be moved manually into a horizontal position to permit the escape of the reserve supply, and buoyant means carried by the outlet means for restoring the outlet means to its vertical position upon rise of liquid level in the tank.

2. The combination with a gasoline tank having an outlet opening, an outlet means in the opening and arranged to stand in an approximately vertical position, at times, and in a horizontal position, at times, means on the outlet means for holding the latter in its vertical position and which permits manual movement of the outlet means into horizontal position, and a float carried by the outlet means for swinging the latter into its normal vertical position.

3. The combination with a gasoline tank, of an outlet pipe swiveled in the outlet opening of the tank, and movable to stand in an approximately vertical position, at times, and in a horizontal position, at times, a weight on the pipe for normally holding the latter in its vertical position, said pipe being arranged to be moved manually into horizontal position, and a float carried by the pipe for swinging the pipe into its vertical position upon the rise of the level of the gasoline in the tank.

In testimony whereof, I affix my signature.

EDWARD BLOOM.